United States Patent [19]
Ledingham

[11] Patent Number: 6,105,757
[45] Date of Patent: Aug. 22, 2000

[54] RAIL AND BED SYSTEM

[75] Inventor: Stuart J. Ledingham, Irvine, Calif.

[73] Assignee: Valu Engineering, Inc., Irvine, Calif.

[21] Appl. No.: 08/540,001

[22] Filed: Oct. 6, 1995

[51] Int. Cl.[7] .................................................. B65G 21/20
[52] U.S. Cl. ........................ 198/836.3; 198/721; 198/838; 198/841
[58] Field of Search .................................. 198/721, 836.3, 198/838, 845, 841; 193/33; 238/10 R, 148; 191/22 DM, 29 DM

[56] References Cited

U.S. PATENT DOCUMENTS

| | | | |
|---|---|---|---|
| 1,812,112 | 6/1931 | Morgan | 198/845 |
| 4,930,623 | 6/1990 | Johnson et al. | 198/841 |
| 5,211,280 | 5/1993 | Houde | 198/836.3 |
| 5,251,732 | 10/1993 | Bruning | 191/29 DM |
| 5,291,988 | 3/1994 | Leonard | 198/836.3 |
| 5,819,911 | 10/1998 | Ledingham | 198/836.3 |

OTHER PUBLICATIONS

ValuEngineering, ValuGuide® New Product Bulletin No. 10.0A, Mar. 1993.
ValuEngineering, ValuGuide® New Product Bulletin No. 10.1A, Sep. 1993.
ValuEngineering, ValuGuide® New Product Bulletin No. 10/139, Sep. 1993.
ValuEngineering, ValuGuide® New Product Bulletin No. 20.0A, Dec. 1994.
ValuEngineering, ValuGuide® New Product Bulletin No. 10.0B, Apr. 1995.
ValuEngineering, ValuGuide® New Product Bulletin No. 30.1A, Apr. 1995.
Nolu Plastics, Inc., Catalog 300, 1986, "Attachment Brackets".
Nolu Plastics, Inc., Catalog 818, 1985, "Aluminum Can Line Guide Rails".
Nolu Plastics, Inc., Catalog 820, 1989, "Aluminum Guide Rail Assemblies", pp. 15–16.
Pobco® Plastics and Hardwood, Catalog 900, 1990, "Guide Rails and Compression Clips", p. 18.
Pobco® Plastics and Hardwood, Catalog 900, 1990, "Guide Rails", p. 20.

*Primary Examiner*—Jospeh E. Valenza
*Attorney, Agent, or Firm*—Knobbe, Martens, Olson & Bear, LLP

[57] ABSTRACT

A rail comprising a rail member and at least one plug is used to direct the flow of objects along a predetermined path of an assembly line or conveyor belt system or to support the weight of the objects thereon. In its preferred embodiments, a stainless steel member has a generally U-shaped cross-section and a polished outer surface which is of particular advantage for use with PET plastic products. One or more plugs provide structural integrity and prevent rotation of the rail member in a clamp of the rail guide support assembly which is used to grip the rail.

25 Claims, 2 Drawing Sheets

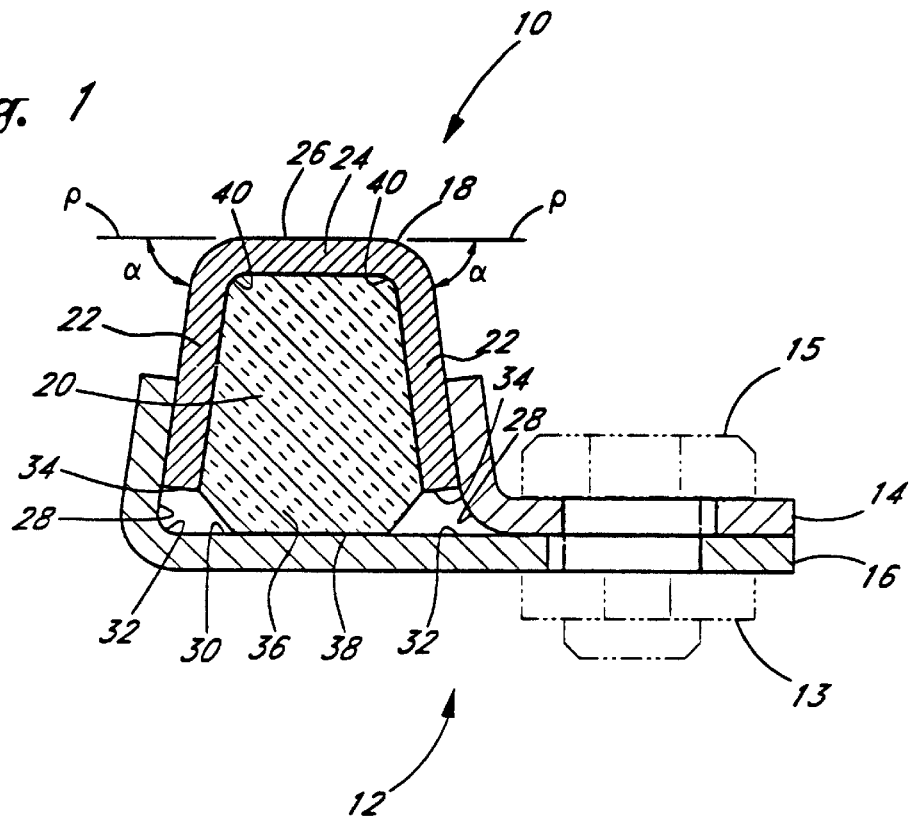
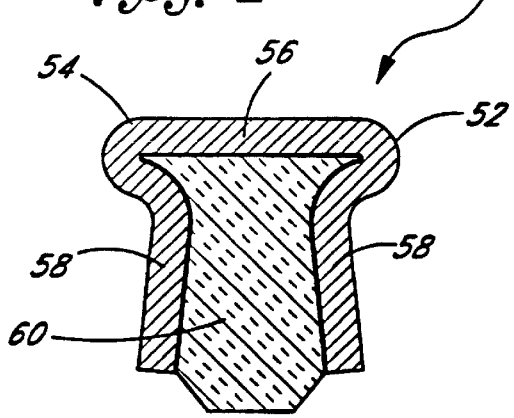
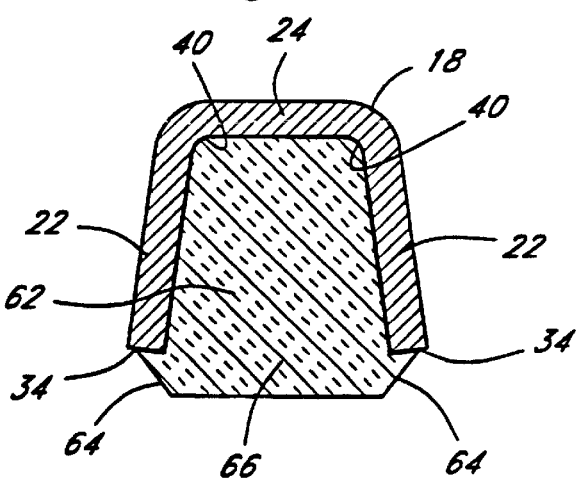

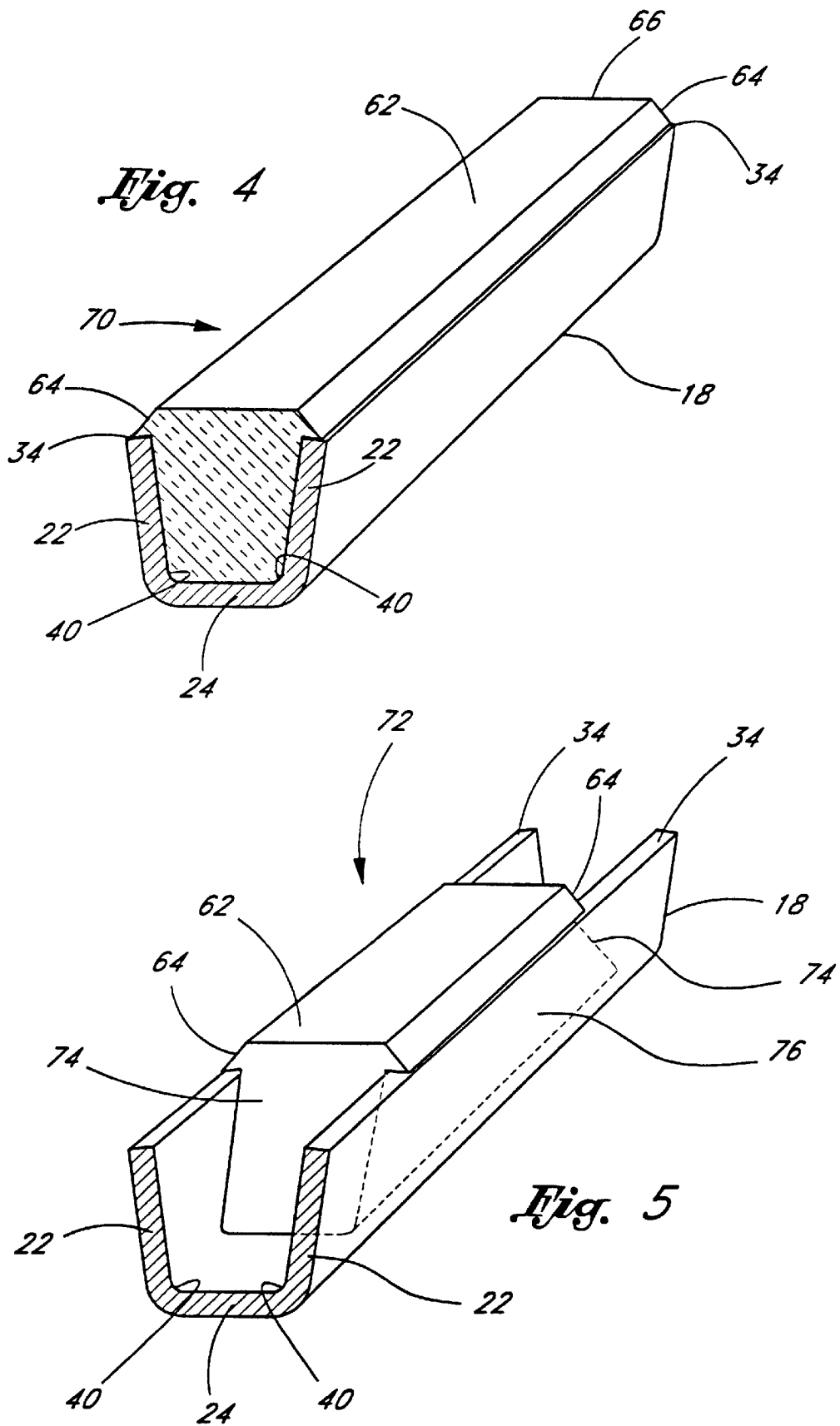

RAIL AND BED SYSTEM

BACKGROUND OF THE INVENTION

1. Field of the Invention

The present invention relates to guide rail assemblies used in assembly line and conveyor belt systems. In particular, the improved rail and bed system of the present invention facilitates the guided transport of objects down a predetermined path.

2. Description of the Related Art

Manufacturers commonly utilize conveyor systems in processing, packaging, and assembly lines in which a product travels on a track or belt and is transported through or between various manufacturing procedures. Guide rails are provided to maintain the desired direction of travel, to maintain specific positioning of the product during a procedure, and/or to prevent lateral movement which may result in the product falling off the belt.

Rail guide support assemblies are typically utilized on each side of the conveyor belt structure to align one, two, or more guide rails which are spaced apart vertically along the predetermined path. In some instances brackets are attached to the sides of the conveyor belt structure, and support rods are mounted to the brackets. Clips or clamps are secured to the support rods, and the clamps position and support the guide rails.

Presently, guide rails comprising UHMW plastic, a polyethylene, are commonly used in conveyor systems to direct products traveling along the belt and to prevent the products from falling off the track or belt. However, many of these products, such as soda bottles, are blow-molded from polyethylene terephthalate (PET) plastic that is easily scratched by the UHMW plastic guide rails.

In the past, cylindrical and flat, rectangular metal bars have been utilized as guide rails in connection with products that are not compatible with UHMW plastic. However, these guide rails are heavy and often not compatible with conventional clamps. Therefore, a metal guide rail that is sturdy and compatible with guide rail clamps currently installed in connection with conveyor systems would be desirable.

SUMMARY OF THE INVENTION

A rail and bed system constructed in accordance with the present invention overcomes limitations associated with the use of the UHMW plastic and round metal guide rails. In the present invention, a rail for use in guiding or supporting products being transported along a conveyor system or assembly line is secured to a support device and comprises a rail member with a plug contained therein. The preferably metallic member has two side sections formed longitudinally and an intermediate section therebetween. The side sections preferably form about an 82-degree angle to a plane tangential to the intermediate section, and the outer surface of the member is substantially smooth.

A portion of the plug preferably extends beyond the edges of the member's side sections. This portion contacts the support device or clamp and prevents rotation of the member about its longitudinal axis, thereby preventing misalignment of the rail during operation of the conveyor system. In addition, the plug provides support for the guide rail. Any misalignment of the guide rails may result in damage to the products being conveyed as well as reduce the efficiency of the conveyor system.

In a preferred embodiment, the rail and bed system comprises a polished steel member having a U-shaped cross-section and a semi-rigid plug formed of a thermoplastic material. The thermoplastic material may be urethane. A portion of the plug extending beyond the side edges of the steel member may, optionally, at least partially overlap these edges. A single, longer plug extending the length of the rail member may be used, or, alternately, a plurality of shorter plugs may be used.

An important feature of the rail and bed system of the present invention is that it is compatible with existing rail guide support assemblies and clamps for the UHMW plastic guide rails. Thus, only the plastic guide rails of an existing conveyor system require replacement in order to better accommodate the transport of PET plastic products and the like. The conveyor system may be utilized by the manufacturer with either the rails of the present invention or plastic guide rails, according to its needs, without requiring separate conveyor system components for the UHMW plastic rails and the rails of the present invention. That is, a conveyor system may be used in connection with various products requiring only replacement of the guide rails without replacing the accompanying clamps or other support structure.

Another important feature of the present invention is that, because of its generally U-shaped cross-section, the rail member is easier to bend for curves in the conveyor system path than the solid metal rod or bar guide rails previously utilized. Structural integrity of the U-shaped rail member is increased by the use of the plugs. The plugs also prevent the failure or collapse of the rail member if too much pressure from the clamp or clip is applied.

Yet another important feature afforded by the present invention is that the material and manufacturing costs of the rail member, even in combination with the plug, is no more than the material and manufacturing costs for an equivalent amount of UHMW plastic or cylindrical metal bar guide rails. The plug may be produced as shorter segments spaced apart within the rail member to further reduce material costs.

In alternate embodiments, the plug may have a ridged or uneven surface which grips the inner surface of the rail member. Alternatively, the rail member may have a head section which secures the plug within.

A preferred method of attaching a guide rail of the present invention to a clamp comprises first inserting a semi-rigid plug into a stainless steel rail member. The member is then secured in the clamp such that the polished outer surface is exposed, and the plug may contact the interior of the clamp thereby preventing rotation of the rail member about its longitudinal axis within the clamp. When a plurality of plugs are used, they are inserted to be spaced apart along the length of the rail member.

In addition, the guide rail of the present invention may be utilized as a support for the bed of a conveyor belt in the conveyor system. The guide rail of the present invention provides a lightweight conveyor bed support member that supports the belt, and therefore the products placed on the belt, proceed down a predetermined path.

Further advantages and applications will become apparent to those skilled in the art from the following detailed description and the drawings referenced herein.

BRIEF DESCRIPTION OF THE DRAWINGS

FIG. 1 is a cross-sectional view of a rail of the present invention utilized with a clamp for a rail guide support assembly;

FIG. 2 is a cross-sectional view of an alternate embodiment of a rail of the present invention;

FIG. 3 is a cross-sectional view of yet another embodiment of a rail of the present invention;

FIG. 4 is a cross-sectional perspective view of the rail of FIG. 3 with the rail inverted to show a single long plug extending substantially the length of the rail member; and FIG. 5 is a cross-sectional perspective view of the rail of FIG. 3 with the rail inverted to show one of a plurality of short plugs to be spaced apart within the rail member.

DETAILED DESCRIPTION OF THE PREFERRED EMBODIMENTS

A preferred embodiment of a rail of the rail and bed system of the present invention is illustrated in FIG. 1 and generally referenced by the numeral 10. The rail 10 is secured to a clip or clamp 12 of a rail guide support assembly which may further include a support rod and bracket (not shown). The rail 10 may be used in connection with a variety of clamps known to those of skill in the art. In the drawings described herein, the rail is shown generally orthogonal to its actual position when used as a guide rail with a clamp for guiding products down a path of an assembly line or conveyor belt system. The rail position in FIGS. 4 and 5, if inverted 180 degrees, would be appropriate for the rail when used in a track or bed of a conveyor structure. The drawings are used to illustrate the general features of a rail constructed in accordance with the present invention.

Referring to FIG. 1, two separate portions 14, 16 of the clamp 12 are secured using a nut 13 and bolt 15 (shown in phantom), and the tightening of the two portions 14, 16 secures the rail 10 therebetween. It is understood by those of ordinary skill in the art that other rail support devices besides the two-part clamp 12 shown may be utilized while still enjoying the benefits of the present invention. In addition, the rail 10 may also be used in the bed of the conveyor system to support the belt and products being transported using appropriate support devices to secure the rail as are well known in the art.

The rail 10 constructed in accordance with the present invention comprises a rail member 18 and an insert or plug 20 contained within the member 18. The member 18 has two side sections 22 formed longitudinally and an intermediate section 24. The member sections 22, 24 generally form a U-shaped cross-section of the member 18, with the side sections 22 formed at least about 60 degrees from a plane P tangential to the intermediate section 24. The plug 20 substantially fills the interior formed by the member sections 22, 24. An outer surface 26 of the rail member 18 is preferably substantially smooth, especially at the region of the intermediate section 24, for nearly frictionless contact with the products being conveyed.

The clamp 12 generally forms two inner side surfaces 28 and an inner middle surface 30, with two inner corners 32 formed between the side and middle surfaces 28, 30. The two side sections 22 of the rail member 18 have edges 34 which are precluded by an extending portion 36 of the plug 20 from contacting either the middle surface 30 of the clamp 12 or its inner corners 32. The extending portion 36 preferably has a planar surface 38 substantially parallel to the plane P of the intermediate section 24 of the rail member 18. Thus, the member 18 is more securely fixed within the clamp 12 and prevented by the plug 20 from rotating in the clamp 12 during the long-term operation of the conveyor system.

Alternatively, the plug 20 may have a planar surface 38 in approximately the same plane as the edges 34 of the side sections 22 of the rail member 18. In such an embodiment the edges 34 may contact the middle inner surface 30 of the clamp 12. As will be easily understood by those of skill in the art, if both edges 34 contact corresponding flat surfaces of the clamp 12, the member 18 would be prevented from rotating during use.

The rail member 18 of FIG. 1 is preferably formed from a strip or ribbon of polished stainless steel having a thickness of about 0.075 inches and a width of about 1.370 inches. The width is comprised of the two side sections 22, each approximately 0.485 inches, and the intermediate section 24, approximately 0.37 inches, with inner corners 40 formed therebetween having a radius of curvature of about 0.052 inches. An angle α formed between the side sections 22 and the intermediate section 24 is preferably about 82 degrees; although, other angles somewhat larger or smaller may alternately be used. Conventional manufacturing procedures may be used to form different lengths of the rails 10, as desired. In addition, the strip or ribbon used to manufacture the rail member 18 may be of various sizes, as will be easily understood by those of skill in the art.

Without the plug 20, the member 18 would require additional manufacturing procedures to conform its longitudinal edges 34 to the inner corners 32 of the clamp 12 in order to prevent rotation of the member 18 about its longitudinal axis either during tightening of the clamp 12 or as products are passed across the rail 10.

In the present invention, the inner surface of the rail member 18 may be left unpolished or rough to better grip the plug 20 contained therein. Or, the plug 20 may have an uneven surface, formed by ridges, knurling, or the like, for better adherence with the member 18 and also the clamp 12. Another method of securing the plug 20 in the member 18 is to use an adhesive on the member's inner surface or the plug 20.

Referring now to FIG. 2, an alternate embodiment of a rail 50 of the present invention is illustrated. A "head" section 52 of a rail member 54 is provided. The member 54 has an intermediate section 56 and longitudinal side sections 58. A plug 60 corresponding to this member 54 substantially fills the head section 52 and is therefore securely fitted within, due to the formation of the head section 52, so that no additional gripping method, such as ribbing on the plug surface, is necessary.

Another embodiment of a plug 62 of the present invention, shown in cross-section in FIG. 3 and in perspective in FIGS. 4 and 5, has rims 64 on its extended portion 66 which at least partially overlap the edges 34 of the side sections 22 of the rail member 18. The member 18 shown is that of FIG. 1; however, it is understood that this overlap may also be used for the plug 60 of FIG. 2. Advantageously, the rim 64 aids in the cleaning and washability of the guide rail 10.

The plug 20, 60, 62 is preferably formed from a semi-rigid thermoplastic material and may be urethane, polypropylene, nylon, PVC or the like. Either a single plug length 70 may be used with the member 18, 54, as shown in FIG. 4, or a plurality of shorter plug lengths 72 may be used with the member 18, 54, as indicated in FIG. 5. The single length 70 is preferably substantially the same as the member length. The shorter lengths 72 preferably have sloped ends 74 which generally form a trapezoid 76 (shown partially in phantom in FIG. 5) when viewed longitudinally from the side, and the plugs 72 are spaced apart along the length of the member 18, 54 to provide support to the member 18.

In either the longer or shorter lengths 70, 72, the plug 20, 60, 62 minimizes bending and prevents collapse of the generally U-shaped member 18, 54 when being gripped by a clamp or the like. The structural integrity of the member 18, 54 is significantly enhanced by the plug(s) 20, 60, 62 which also reduce the amount of material required per member 18, 54, as compared to the material necessary for a cylindrical, solid metal bar. The rail 10, 50 of the present invention is also easier to bend to conform to curved paths in the conveyor system than cylindrical metal guide rails due to the U-shaped cross-section of the member 18, 50 and the optional use of shorter plugs 72 spaced within the member 18, 50. As will be easily understood by those of skill in the art, the plug may easily be manufactured having a curved configuration to fit within the member 18 when the member 18 is curved.

In the present invention, a preferred method of attaching a guide rail 10, 50 to a clamp 12 in a conveyor belt system includes (a) inserting a semi-rigid plug 20, 60, 62 into a stainless steel member 18, 54, the member 18, 54 generally forming a U-shape in cross-section and having a polished outer surface 26; and (b) securing the member 18, 54 in the clamp 12 such that its outer surface 26 is exposed and the plug 20, 60, 62 contacts the interior of the clamp 12. The plug 20, 60, 62 thereby prevents the member 18, 54 from rotating about its longitudinal axis while in the clamp 12.

When the member 18, 54 has a head section 52, step (a) may include sliding the plug 60 into the member 54 from one end. Step (a) may also comprise overlapping a portion 64 of the plug 62 over the edges 34 of the U-shape of the member 18, 54 when the plug is so configured. Step (a) is repeated as necessary when a plurality of short plugs 72 are utilized in the rail 10, 50.

Thus, the plug 20, 60, 62 assists in preventing the longitudinal rotation of the rail member 18, 54. This rotation causes rail misalignment that may result in manufacturing inefficiency and possible damage to the products. The rail 10, 50, including the rail member 18, 54 and semi-rigid plug 20, 60, 62 of the present invention, is no more expensive and generally less expensive to manufacture than cylindrical metal guide rails and UHMW plastic guide rails presently used. The rail 10, 50 is compatible with existing rail guide support assemblies, making it easy for manufacturers to incorporate the rail of the present invention into their present assembly lines or conveyor systems for use with PET plastic products either for guiding or for supporting products being transported in the conveyor systems or assembly lines.

The plug 20, 60, 62 of the present invention may also be used to align two guide rails 10, 50. For example, a portion of a plug may be contained within one guide rail while another portion of the plug is contained within a second adjacent guide rail in order to assist in the alignment of the guide rails, as will be easily understood by those of skill in the art.

Moreover, the guide rail 10 of the present invention may be utilized as a conveyor bed in order to support a conveyor belt, and therefore the products traveling on top of the belt. That is, a plurality of guide rails may be aligned such that the intermediate section 24 (FIG. 1) of the guide rail 10 supports the conveyor belt (not shown). As a result, the guide rail 10 of the present invention would replace rollers or other means known to those of skill in the art to support the conveyor belt. Preferably, the guide rails would be arranged at an angle less than 90 degrees with respect to the edge of the conveyor belt to promote even wear of the belt and support products traveling on the belt, as will be easily understood by those of skill in the art.

The embodiments illustrated and described above are provided merely as examples of the rail and bed system constructed in accordance with the present invention. Other changes and modifications can be made from the embodiments presented herein by those skilled in the art without departure from the spirit and scope of the invention, as defined by the appended claims.

What is claimed is:

1. A rail for use in guiding or supporting products being transported along a predetermined path in a conveyor system, said rail secured to a support device, said rail comprising:

a rail member having two side sections formed longitudinally and an intermediate section therebetween, said side sections forming an angle at least about 60 degrees to a plane tangential to said intermediate section, said member having a substantially smooth outer surface; and a plug substantially contained in said member, a portion of said plug extending beyond edges of said side sections;

wherein said portion of said plug extending beyond said side sections of said member contacts the support device, thereby preventing rotation of said member about its longitudinal axis and misalignment of said rail during operation of said conveyor system.

2. The rail of claim 1, wherein more than one plug is contained within said member.

3. The rail of claim 2, wherein each of said plugs has a generally trapezoidal shape when viewed from a side of said plug.

4. The rail of claim 1, wherein said angle is approximately 82 degrees.

5. The rail of claim 1, wherein said portion of said plug extending beyond said side sections at least partially overlaps said edges of said side sections.

6. The rail of claim 1, wherein said intermediate section forms a head section extending over said side sections, said plug configured to have a shape corresponding to said head section for secure engagement within said member.

7. The rail of claim 1, wherein said member is stainless steel and said outer surface is polished.

8. The rail of claim 1, wherein said plug is formed from urethane.

9. The rail of claim 1, wherein said plug is formed from nylon.

10. The rail of claim 1, wherein said plug is formed from polyvinylchloride.

11. The rail of claim 1, wherein said plug is formed from polypropylene.

12. A rail for use in guiding or supporting products being transported along a predetermined path in a conveyor system, said rail secured to a clamp, said rail comprising:

a rail member generally forming a U-shape in cross-section and having a substantially smooth outer surface; and a semi-rigid plug contained within said member, said member secured to said clamp such that at least a portion of said outer surface is exposed, said plug contacting said clamp such that said member is prevented from rotating therein about its longitudinal axis.

13. The rail of claim 12, wherein more than one plug is contained within said member.

14. The rail of claim 13, wherein each of said plugs has a trapezoidal shape when viewed from the side of said plug.

15. The rail of claim 12, wherein a portion of said plug at least partially overlaps edges of said member.

16. The rail of claim 12, wherein said plug is substantially flush with edges of said member.

17. The rail of claim 12, wherein said member is polished stainless steel.

18. The rail of claim 12, wherein said plug is formed from a thermoplastic material.

19. A method of attaching a guide rail to a clamp in a conveyor belt system, comprising:

a) inserting a semi-rigid plug into a stainless steel member generally having a U-shaped cross-section, said member having a polished outer surface; and b) securing said member to said clamp such that said outer surface is exposed and said plug contacts the interior of said clamp, thereby preventing said member from rotating about its longitudinal axis.

20. The method of claim 19, wherein step a) is repeated for a plurality of semi-rigid plugs.

21. A rail system for use with a conveyor system, said rail system comprising:

a clamp for securing said rail system to the conveyor system;

a rail member generally forming a U-shape in cross-section, said member having a substantially smooth outer surface; and a semi-rigid plug contained within said member, said member secured to said clamp such that at least a portion of said outer surface is exposed, said plug contacting said clamp such that said member is prevented from rotating therein.

22. The system of claim 21, wherein a plurality of semi-rigid plugs are contained within said member.

23. The system of claim 21, wherein said member is polished stainless steel.

24. The system of claim 21, wherein said plug is formed from a thermoplastic material.

25. A rail system for use with a conveyor system, said rail system comprising:

a plurality of rail members, each of said rail members generally forming a U-shape in cross section; and at least one semi-rigid plug contained within each of said rail members.

\* \* \* \* \*